United States Patent
Matsuda

(10) Patent No.: US 10,417,551 B2
(45) Date of Patent: Sep. 17, 2019

(54) WIRELESSLY COMMUNICABLE SEPARABLE SYSTEM

(71) Applicant: CANON KABUSHIKI KAISHA, Tokyo (JP)

(72) Inventor: Kotaro Matsuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/934,754

(22) Filed: Mar. 23, 2018

(65) Prior Publication Data

US 2018/0285712 A1 Oct. 4, 2018

(30) Foreign Application Priority Data

Mar. 30, 2017 (JP) .................. 2017-067277

(51) Int. Cl.
*G08B 13/14* (2006.01)
*G06K 19/077* (2006.01)

(52) U.S. Cl.
CPC ... *G06K 19/07798* (2013.01); *G06K 19/0776* (2013.01); *G06K 19/0779* (2013.01); *G06K 19/07767* (2013.01)

(58) Field of Classification Search
CPC ......... G06K 19/07798; G06K 19/0779; G06K 19/0776; G06K 19/07767; G06K 19/04; G06K 19/06187; G06K 19/07726; G06K 19/12; G06K 19/14; G06K 19/06028; G06K 19/07749; G07B 17/00508; G07B 2017/00629; Y10T 156/1082; Y10T 156/10; Y10T 156/1064; Y10T 156/1021; Y10T 156/1051; Y10T 156/1093
USPC .......................................... 340/572.1–572.9
See application file for complete search history.

(56) References Cited

U.S. PATENT DOCUMENTS

| | | | | |
|---|---|---|---|---|
| 6,693,544 | B1 * | 2/2004 | Hebbecker | G06K 19/02 235/487 |
| 7,812,706 | B2 * | 10/2010 | Suzuki | G06K 19/04 235/383 |
| 9,697,711 | B2 * | 7/2017 | McIntosh | G08B 13/2414 |
| 2007/0229261 | A1 * | 10/2007 | Zimmerman | H04B 5/0062 340/572.1 |
| 2009/0121876 | A1 * | 5/2009 | Satoh | G06K 19/072 340/572.3 |

FOREIGN PATENT DOCUMENTS

JP 2010-205164 A 9/2010

* cited by examiner

*Primary Examiner* — Anh V La
(74) *Attorney, Agent, or Firm* — Canon U.S.A., Inc. IP Division

(57) ABSTRACT

An RFID unit includes an RFID unit A and an RFID unit B that are separable on a break line, where the RFID unit A includes an IC chip portion A that stores an UUID and an antenna portion A, and the RFID unit B includes an IC chip portion B that stores an UUID and an antenna portion B. Before the RFID unit is separated into the RFID unit A and RFID unit B, either the RFID unit A or RFID Unit B transmits a first signal including the UUID. After the separation, at least either the RFID unit A or RFID unit B transmits a second signal, different from the first signal, including the UUID.

12 Claims, 13 Drawing Sheets

FIG.5
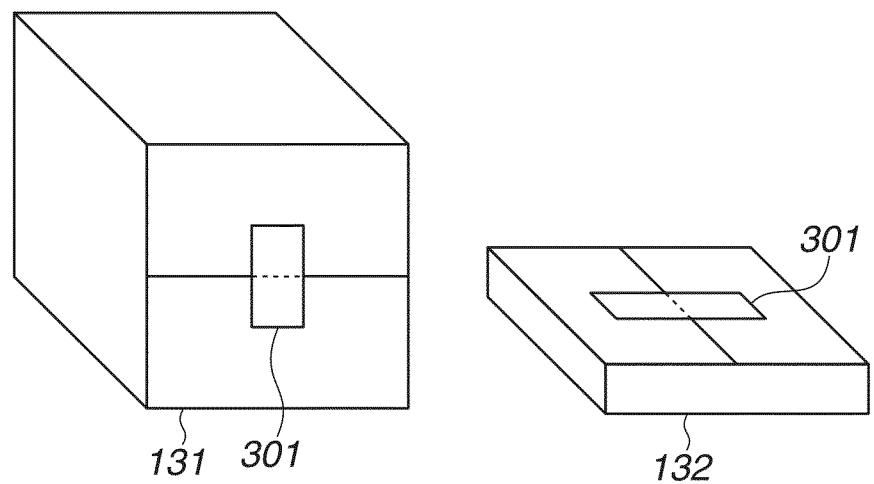
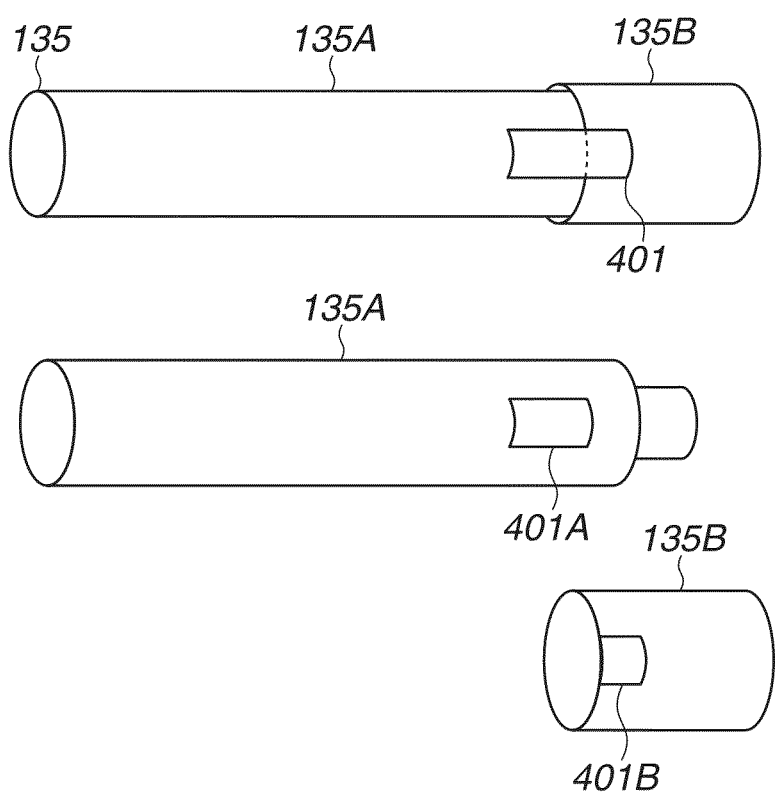

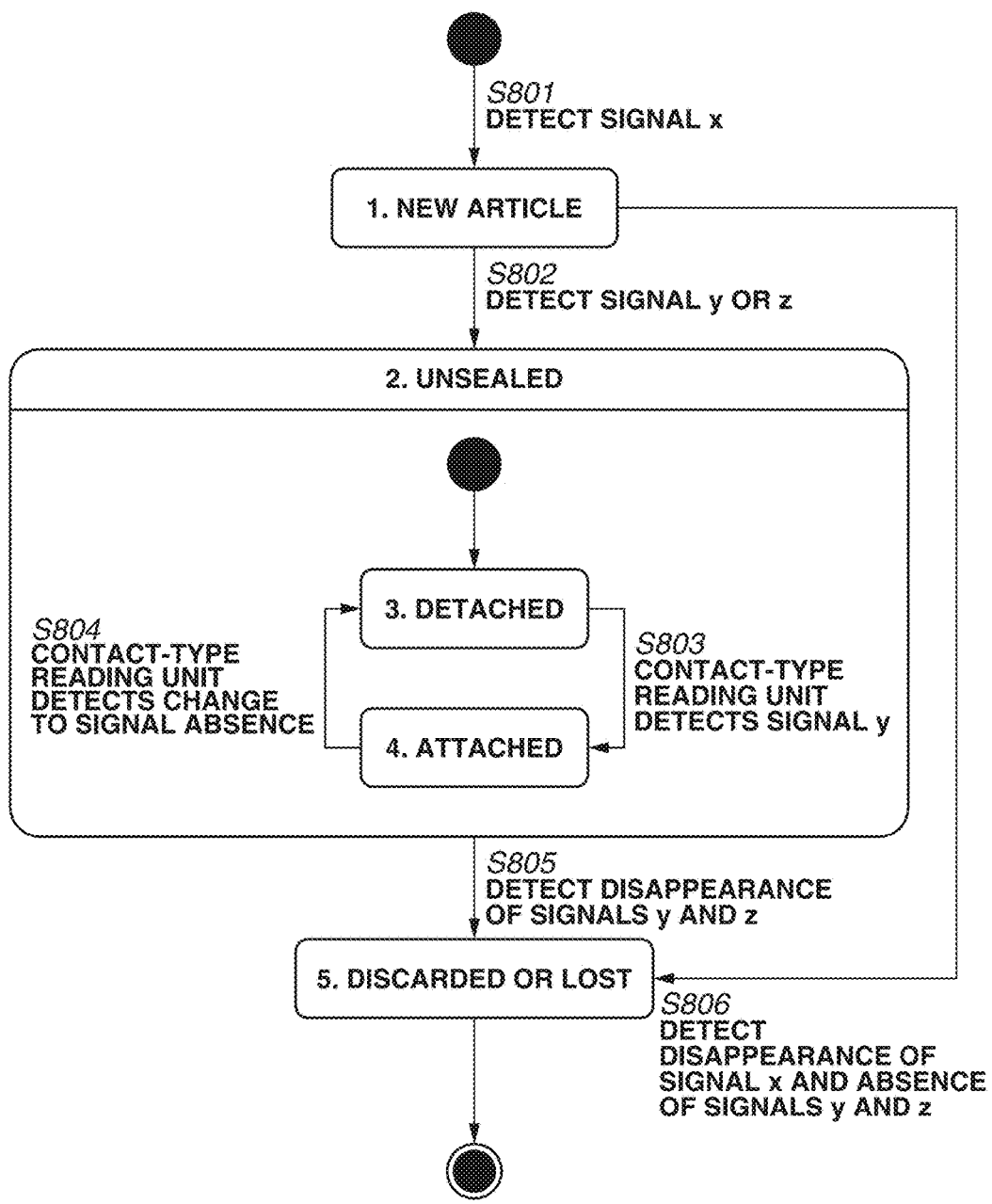

FIG.9

STATUS VIEW

PACKAGE TYPE: PAPER

LIST VIEW

| UUID | MAKER | PRODUCT NAME | PRODUCT CODE | PACKAGE TYPE | SERIAL NUMBER | DATE OF MANUFACTURE | STATUS | STATUS UPDATE DATE AND TIME |
|---|---|---|---|---|---|---|---|---|
| e78b374a-9abd-4ad5-b8bc-61cb6f4b911 | C COMPANY | PRINTER PAPER PR01 | PP-P1 | CARTON | F01-L60-1608 | AUG. 16, 2016 | NEW ARTICLE | JAN. 19, 2017 4:31:51 P.M. |
| b95dc66a-11d2-4ad7-8ce6-832bd4161f7 | C COMPANY | PRINTER PAPER N1 | PP-N1 | COMMERCIAL PACKAGING PAPER | F01-L59-1609 | SEP. 29, 2016 | UNSEALED | JAN. 17, 2017 3:51:00 P.M. |
| 8908fec1-a690-4e31-8883-052a1d1ebb | C COMPANY | PRINTER PAPER N1 | PP-N1 | COMMERCIAL PACKAGING PAPER | F01-L59-1609 | SEP. 29, 2016 | DISCARDED | JAN. 11, 2017 10:17:55 A.M. |
| 9b71dbd8-cc16-42af-8bf2-a7125c130e0a | C COMPANY | PRINTER PAPER N1 | PP-N1 | CARTON | F01-L59-1609 | SEP. 29, 2016 | UNSEALED | JAN. 11, 2017 10:11:22 A.M. |
| 3d1d2679-147c-4316-9881-11aa0d8a17a | C COMPANY | PRINTER PAPER N1 | PP-N1 | COMMERCIAL PACKAGING PAPER | F01-L59-1609 | SEP. 29, 2016 | LOST | JAN. 8, 2017 8:23:59 P.M. |
| 1dc98737-da94-4b42-bd1e-42f510da2787 | C COMPANY | PRINTER PAPER N1 | PP-N1 | COMMERCIAL PACKAGING PAPER | F01-L59-1609 | SEP. 29, 2016 | NEW ARTICLE | JAN. 8, 2017 1:43:03 P.M. |
| ... | ... | ... | ... | ... | ... | ... | ... | ... |

FIG.10

STATUS VIEW

PACKAGE TYPE: PAPER

INDIVIDUAL VIEW

☐ ARTICLE INFORMATION

| UUID | MAKER | PRODUCT NAME | PRODUCT CODE | PACKAGE TYPE | SERIAL NUMBER | DATE OF MANUFACTURE |
|---|---|---|---|---|---|---|
| 8908fcc1-a690-4e31-8883-0f52a1d1ebb | C COMPANY | PRINTER PAPER N1 | PP-N1 | COMMERCIAL PACKAGING PAPER | F01-L59-1609 | SEP. 29, 2016 |

*1001*

☐ STATUS HISTORY

| STATUS | STATUS UPDATE DATE AND TIME |
|---|---|
| DISCARDED | JAN. 11, 2017 10:17:55 A.M. |
| UNSEALED | JAN. 11, 2017 10:01:22 A.M. |
| NEW ARTICLE | JAN. 8, 2017 1:43:03 P.M. |

1100 STATUS VIEW

PACKAGE TYPE: TONER CARTRIDGE

LIST VIEW

| UUID | MAKER | PRODUCT NAME | PRODUCT CODE | PACKAGE TYPE | SERIAL NUMBER | DATE OF MANUFACTURE | STATUS | STATUS UPDATE DATE AND TIME |
|---|---|---|---|---|---|---|---|---|
| a9b71e6f-577e-441b-aab1-63d2f52ea5ef | C COMPANY | TONER YELLOW | TN-G1-Y | TONER CARTRIDGE | F01-T11-1606 | JUN. 16, 2016 | DETACHED | JAN. 23, 2017 5:31:51 P.M. |
| 541df206-f1e4-4624-a6d1-67453b44a977 | C COMPANY | TONER MAGENTA | TN-G1-M | TONER CARTRIDGE | F01-T11-1607 | JUL. 3, 2016 | DISCARDED | JAN. 23, 2017 3:51:00 P.M. |
| 129ede60-e788-4822-96f9-7b0f3d6ce1d5 | C COMPANY | TONER CYAN | TN-G1-C | TONER CARTRIDGE | F01-T11-1607 | JUL. 1, 2016 | ATTACHED | JAN. 23, 2017 3:11:55 P.M. |
| dc8124e-d4dc-4942-9a84-9df1eeb49bd1 | C COMPANY | TONER BLACK | TN-G1-K | TONER CARTRIDGE | F01-T12-1607 | JUL. 22, 2016 | NEW ARTICLE | JAN. 20, 2017 9:46:22 A.M. |
| 06773b6-76ee-4a6c-b3fc-62364c713dfc | C COMPANY | TONER CYAN | TN-G1-C | TONER CARTRIDGE | F01-T12-1607 | JUL. 11, 2016 | NEW ARTICLE | JAN. 20, 2017 9:45:03 A.M. |
| ⋮ | ⋮ | ⋮ | ⋮ | ⋮ | ⋮ | ⋮ | ⋮ | ⋮ |

STATUS VIEW — 1200

PACKAGE TYPE: PAPER

INDIVIDUAL VIEW

☐ ARTICLE INFORMATION

| UUID | MAKER | PRODUCT NAME | PRODUCT CODE | PACKAGE TYPE | SERIAL NUMBER | DATE OF MANUFACTURE |
|---|---|---|---|---|---|---|
| 541df206-f1e4-4624-a8d1-67453b4a977 | C COMPANY | TONER MAGENTA | TN-G1-M | TONER CARTRIDGE | F01-T11-1607 | JUL. 3, 2016 |

— 1201

☐ STATUS HISTORY

| STATUS | STATUS UPDATE DATE AND TIME |
|---|---|
| DISCARDED | JAN. 23, 2017 3:51:00 P.M. |
| DETACHED | JAN. 23, 2017 2:22:11 P.M. |
| ATTACHED | DEC. 10, 2016 1:59:03 P.M. |
| UNSEALED | DEC. 10, 2016 1:56:30 P.M. |
| NEW ARTICLE | NOV. 30, 2016 10:10:32 A.M. |

```
{
    "uuid": "9b71dbd8-cc16-42af-8bf2-a7125c130e0a",
    "unit-name": "carton",
    "sub-unit": [
      {
         "uuid": "b95dc66a-11d2-4ad7-8ce6-a832bd4161f7",
         "unit-name": "packaged paper"
      },
      {
         "uuid": "8908fcc1-a690-4e31-8883-b0f52a1d1ebb",
         "unit-name": "packaged paper"
      },
      {
         "uuid": "3d1d2679-147c-43f6-988f-c11aa0d8a17a",
         "unit-name": "packaged paper"
      },
      {
         "uuid": "1dc98737-da94-4b42-bd1e-42f5f0da2787",
         "unit-name": "packaged paper"
      }
    ]
}
```

WIRELESSLY COMMUNICABLE SEPARABLE SYSTEM

BACKGROUND

Field

The present disclosure relates to a wirelessly communicable separable system including various shapes.

Description of the Related Art

Currently, based on various packages of products and articles distributed in the market, it can be recognized whether a package has been sealed and unsealed. When a package is sealed by a security seal, if it is opened, a pattern or characters can remain on the adhesion surface to indicate the unsealed condition. This enables visually and clearly grasping whether the package is in a sealed condition before opening or an unsealed condition after opening. When the cap of a plastic bottle is unsealed, the lower portion of the cap is partly detached in a ring shape. This enables clearly grasping whether the bottle is in a sealed condition before opening or an unsealed condition after opening.

In recent years, a technology called printable electronics or printed electronics has been developed for manufacturing electronic circuits and electronic devices using printing techniques. This technology enables manufacturing an arbitrary electronic circuit on an on-demand basis, enabling an electronic circuit to be attached to or embedded in any type of product. It is predicted that the development of this technology will enable manufacturing of products including an electronic circuit with unique information recorded for each individual product, at low costs in large amounts.

Japanese Patent Application Laid-Open No. 2010-205164 discusses a technique related to a Radio Frequency Identifier (RFID) type sheet. In the technique discussed in Japanese Patent Application Laid-Open No. 2010-205164, data access through RFID communication is not possible before separating the sheet into a first area and a second area on a cutoff line as a boundary. Data access through RFID communication becomes possible after the separation of the sheet.

In article management business, for example, in sales and support of printers, both dealers and customers as printer users can have some issues controlling inventory of toner, paper, and other consumables. For example, to correctly grasp the inventory figures of customers, it is necessary to take time and effort to manage articles and relevant information. However, with the increase in the use of printable electronics, it has become possible to attach an RFID with unique information recorded therein to packages of consumables for each individual product. This enables the amounts and locations of products to be detected using a wireless RFID reader, where each individual product can be tracked using the unique information recorded in the RFID.

However, as for consumable products, correctly grasping the inventory figures is difficult when the RFID is simply attached to the product because it is necessary to distinguish between a new article and a used article. To correctly grasp the inventory figures of consumables, which can be used, it is necessary to distinguish between the RFID attached to a new consumable and the RFID attached to a used consumable that is to be discarded. As described above, with the conventional technique, it has been difficult to correctly grasp the inventory figures of products when the RFID is simply attached to products. More specifically, it has conventionally been impossible to suitably grasp and track the unsealed condition and use condition of each individual package through wireless communication such as RFID. This problem is not limited to the management of consumables, and there is a similar problem in the management of foods and other various types of articles.

SUMMARY

According to an aspect of the present disclosure, a separable system includes a first unit configured to include an antenna that transmits a signal and a memory that stores identification information, and a second unit configured to include an antenna that transmits a signal and a memory that stores identification information. Upon receipt of an externally generated electromagnetic wave in a state where the first unit and the second unit are connected, a first signal including the identification information stored in the memory of either the first unit or the second unit is transmitted from the antenna of the respective first unit or second unit via wireless communication. In a case where a first system including the first unit and a second system including the second unit are separated by an external factor acting on the separable system, upon receipt of an externally generated electromagnetic wave in at least either the first system or the second system after the separation, a second signal different from the first signal, including the identification information stored in the memory of the first unit or second unit included in the first system or second system respectively, is transmitted from the antenna of the respective first unit or second unit respectively included in the first system or the second system via wireless communication.

Further features will become apparent from the following description of exemplary embodiments with reference to the attached drawings.

BRIEF DESCRIPTION OF THE DRAWINGS

FIG. 5 illustrates examples of applying the RFID units according to the present exemplary embodiment to packages.

FIG. 8 illustrates a state transition of a package to which a RFID unit is attached according to the present exemplary embodiment.

FIG. 9 illustrates an example screen displaying statuses of paper packages according to the present exemplary embodiment.

FIG. 10 illustrates an example screen displaying a history of statuses of paper packages according to the present exemplary embodiment.

FIG. 11 illustrates an example screen displaying statuses of toner cartridge packages according to the present exemplary embodiment.

FIG. 12 illustrates an example screen displaying a history of statuses of toner cartridge packages according to the present exemplary embodiment.

FIG. 13 illustrates an example of an inclusive relation of packages represented in the JavaScript Object Notation (JSON) format according to the present exemplary embodiment.

DESCRIPTION OF THE EMBODIMENTS

Exemplary embodiments will be described below with reference to the accompanying drawings.

A special medium (separable system) according to the present disclosure can perform wireless communication, such as Radio Frequency Identifier (RFID), and can be attached to packages and articles to be tracked. This enables grasping and tracking the unsealed condition and use condition of each individual target product. The separable system according to the present disclosure can include various shapes, including sheet-like, seal-like, and bottle cap-like shapes separable into a plurality of portions.

A system for grasping the unsealed condition and use condition of each individual package to enable tracking using the special medium will be described below with reference to FIG. 1.

Figure 1:
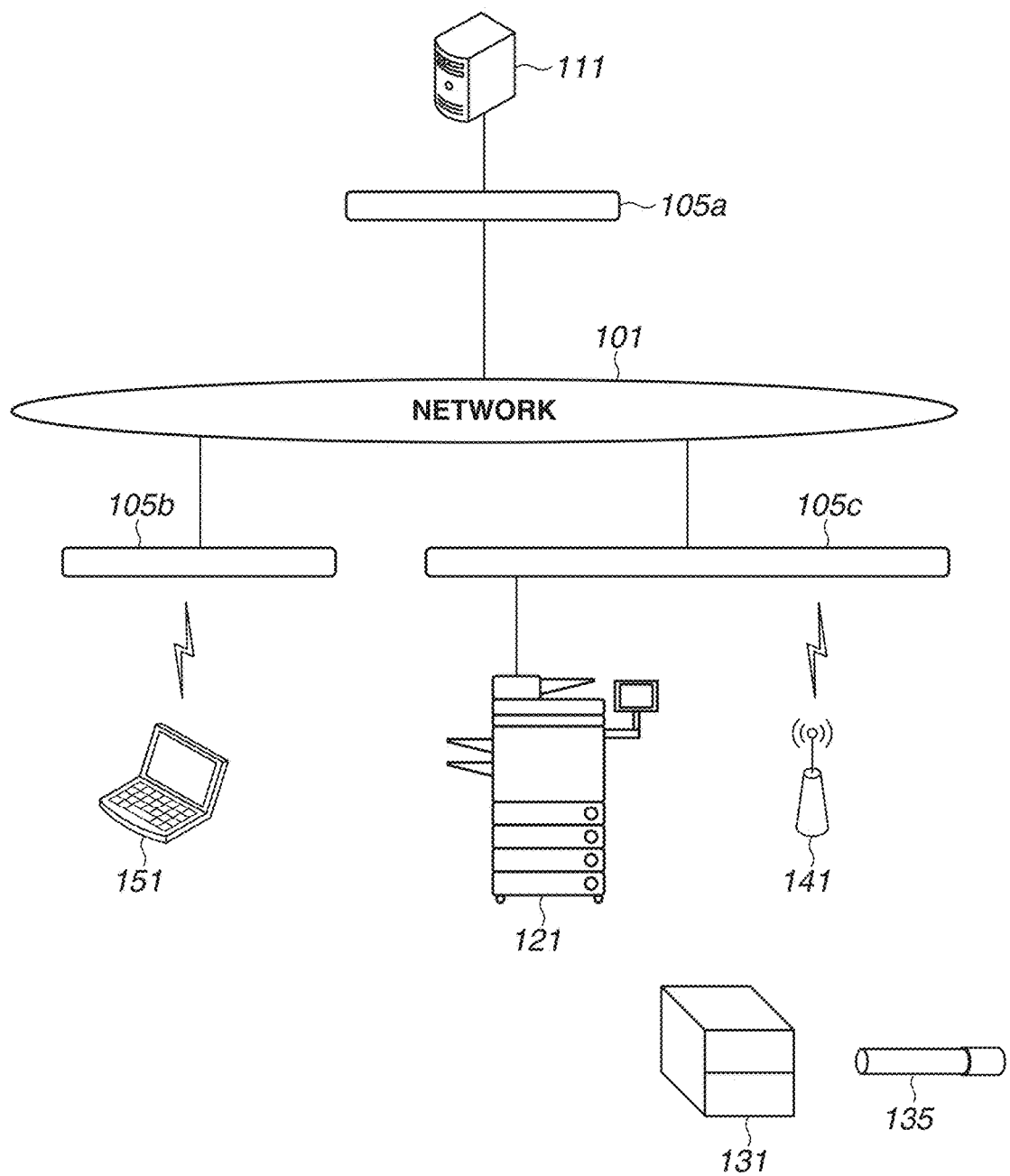
FIG. 1 illustrates a configuration of a system to which a separable system according to the present disclosure is applicable.

FIG. 1 illustrates an example a configuration of a system to which a medium (separable system) according to an exemplary embodiment is applicable.

A management server 111 is connected to a network 101, such as the Internet, via a network 105a. A computer 151 is connected to the network 101 via the network 105b. Forms and types of computers applicable to the computer 151 include a personal computer, laptop computer, tablet computer, and smart phone.

A device 121 is, for example, an office multifunction peripheral or a printer (printing apparatus). A package 131 is a package of paper as one consumable for the device 121. A package 135 is a package of a toner cartridge as one consumable for the device 121. The packages 131 and 135 are provided with an RFID unit (described in detail below). An RFID reader 141 is an apparatus for reading information from the RFID. The device 121 and the RFID reader 141 are connected to the network 101, such as the Internet, via the network 105c.

The networks 105a, 105b, and 105c are private networks or local area networks (LANs). Each apparatus and the network 105 can be connected using a cable or be wirelessly connected.

Figure 2:
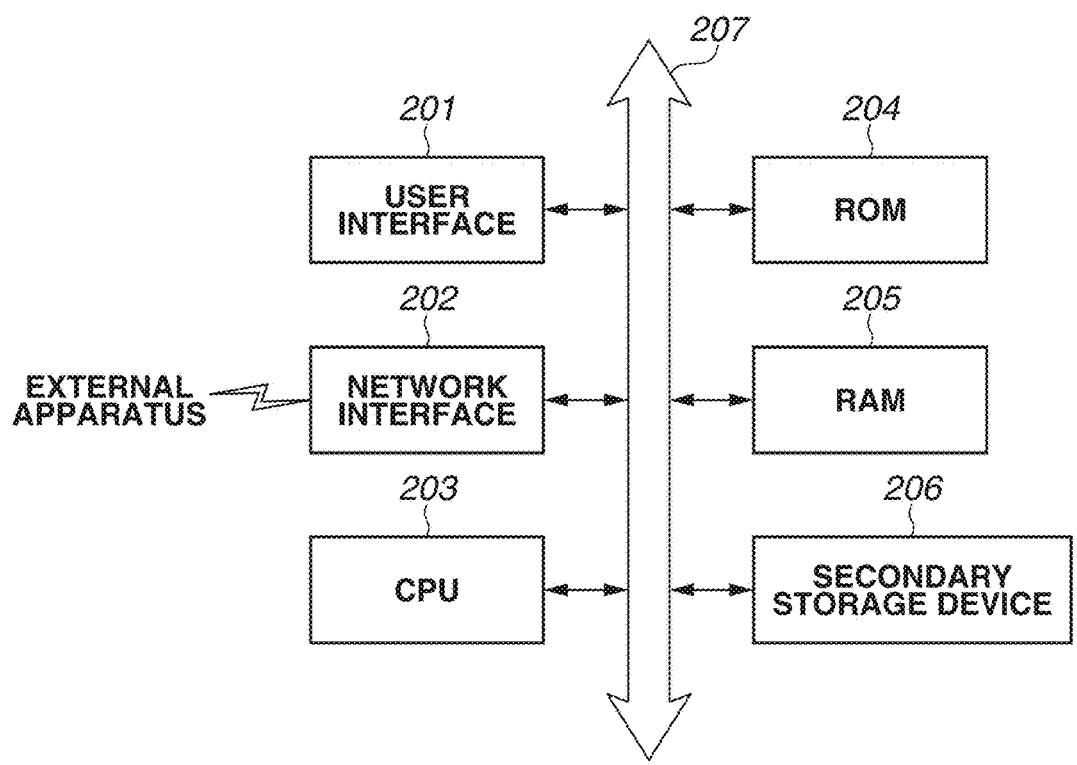
FIG. 2 illustrates a hardware configuration of components of the system according to the present exemplary embodiment.

FIG. 2 illustrates one example of a configuration of an information processing function module of the management server 111, the device 121, the RFID reader 141, and the computer 151.

A user interface 201 inputs and outputs information and signals via a display, keyboard, mouse, touch panel, and buttons. An apparatus not provided with these hardware components can also be connected to and operated from other computers via a remote desktop and remote shell.

A network interface 202 connects with a network, such as a LAN, to communicate with other computers and network devices. Applicable communication methods include wired and wireless communications.

A read only memory (ROM) 204 stores built-in programs and data. A random access memory (RAM) 205 is a temporary storage area. A secondary storage device 206 is a storage device represented by a hard disk (HDD) and a flash memory. A central processing unit (CPU) 203 executes a program read from the ROM 204, the RAM 205, or the secondary storage device 206 to control the apparatus in question. Each of the above-described components 201 to 206 are connected via an input/output interface 207.

While not illustrated in FIG. 2, the RFID reader 141 includes an antenna 621 illustrated in FIG. 6 (described below) in addition to the above-described components. The device 121 is provided with an integrated circuit (IC) chip reader 631 illustrated in FIG. 6 (described below), an image forming unit, and an image reading unit in addition to the above-described components.

The RFID unit according to the present exemplary embodiment will be described below with reference to FIGS. 3A, 3B, 4A, and 4B.

Figure 3A:
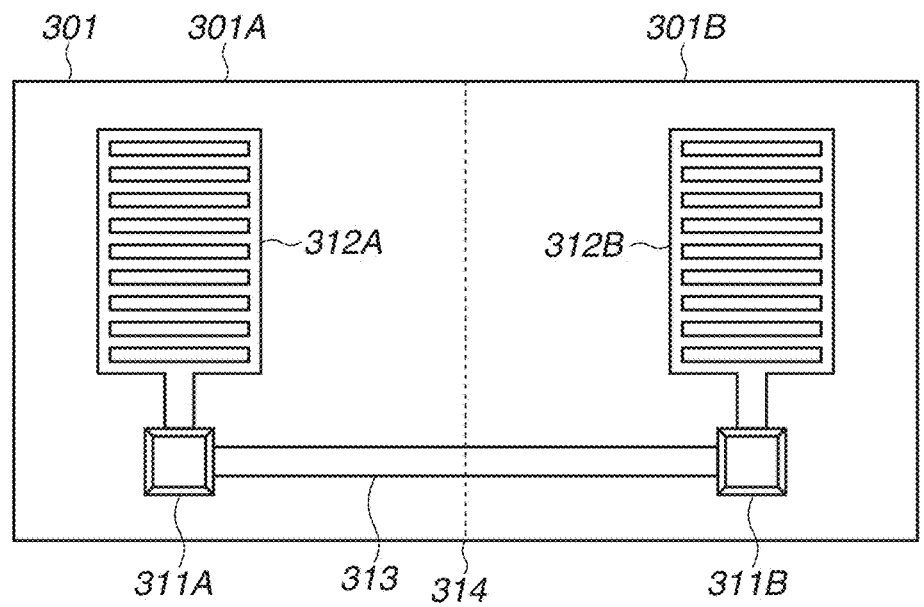
FIGS. 3A and 3B illustrate a first RFID unit according to the present exemplary embodiment.
Figure 3B:
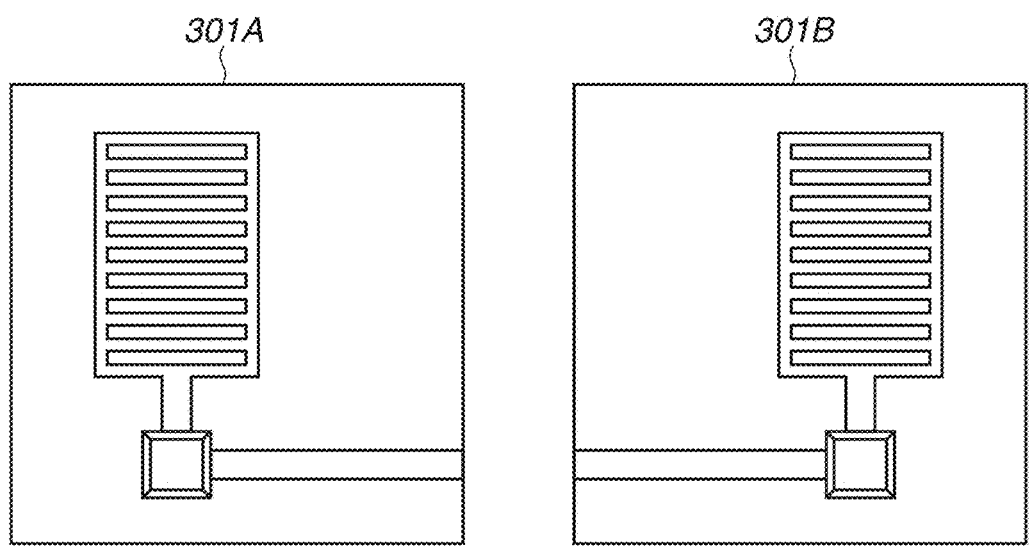

FIGS. 3A and 3B illustrate an example of a first RFID unit according to the present exemplary embodiment.

As illustrated in FIG. 3A, an RFID unit 301 indicates the entire RFID unit. The RFID unit 301 is a medium (separable system) including an RFID unit A 301A and an RFID unit B 301B. The medium (RFID unit) according to the present exemplary embodiment is implemented as a sheet-like or seal-like shape, and applied to a portion to be separated when a user uses an article or system composed of a packing package, ticket, components, and the medium. As long as the medium (RFID unit) is configured to be broken by external pressure, the shape of the medium is not limited to a sheet-like and seal-like shape, and other shapes are also applicable.

The RFID unit A 301A includes an IC chip portion A 311A and an antenna portion A 312A. The antenna portion A 312A is an antenna that transmits a signal. The IC chip portion A 311A includes a memory for storing identification information (ID), such as a unique ID (described below). The RFID reader 141 illustrated in FIG. 1 can acquire information of the IC chip portion A 311A through RFID wireless communication via the antenna portion A 312A.

The RFID unit B 301B includes an IC chip portion B 311B and an antenna portion B 312B. The antenna portion B 312B is an antenna that transmits a signal. The IC chip portion B 311B includes a memory for storing identification information (ID) such as a unique ID (described below). The RFID reader 141 can acquire information of the IC chip portion B 311B through RFID wireless communication via the antenna portion B 312B.

A conductive portion 313 is connected to the IC chip portion A 311A and the IC chip portion B 311B. As illustrated in FIG. 3B, the RFID unit 301 can be separated into two medium pieces, the RFID unit A 301A and the RFID unit B 301B, on a break line 314 as a boundary, by an external factor such as a user's breaking action.

The RFID unit 301 includes common identification information for identifying the individual of the RFID unit 301. More specifically, the identification information is recorded in the IC chip portion A 311A and the IC chip portion B 311B at the time of manufacture. For example, a manufacturer issues a Universally Unique Identifier (UUID) and records the UUID in IC chips and also in a product manufacture database (not illustrated) and the management server 111.

The present exemplary embodiment will be described below on the premise that the ID recorded in the IC chip portion A 311A and the ID recorded in the IC chip portion B 311B are an identical ID, as described above. However, the IDs recorded in respective IC chips can be different IDs. For example, a unique identifier (unique ID) indicating manufacture data of each chip can be recorded therein. When recording different IDs in respective IC chips, information (referred to as "association information") for associating the ID recorded in the IC chip portion A 311A with the ID recorded in the IC chip portion B 311B is recorded in the management server 111 and the product manufacture database (not illustrated).

Alternatively, the above-described association information can be recorded in at least the RFID unit A 301A or the RFID unit B 301B. The above-described association information enables tracking of respective separation pieces even after the RFID unit A 301A and the RFID unit B 301B are separated.

The above-described common ID will be described below as an UUID.

The RFID unit 301 is configured to change signals to be transmitted from the RFID in response to an electromagnetic wave received from external to the RFID unit 301, before and after the separation, based on the electronic circuit design for the IC chip portion A 311A and the IC chip portion B 311B. Table 1 illustrates variations in signals acquirable from the RFID before and after the separation of the RFID unit 301.

TABLE 1

| Separation state | State number | IC chip portion A (wireless) | IC chip portion B (wireless) |
|---|---|---|---|
| Before separation | 1-1 | UUID + signal x | None |
|  | 1-2 | None | UUID + signal x |
| After separation | 2-1 | UUID + signal y | UUID + signal z |
|  | 2-2 | UUID + signal y | None |
|  | 2-3 | None | UUID + signal z |
|  | 2-4 | None | None |

As illustrated in Table 1, when the separation state indicates "Before separation", either the IC chip portion A 311A or the IC chip portion B 311B responds with a signal x in addition to the UUID (state number 1-1 or 1-2). When the separation state indicates "After separation", the IC chip portion A 311A responds with a signal y in addition to the UUID, and the IC chip portion B 311B responds with a signal z in addition to the UUID (state number 2-1). The signals y and z are signal information different from the signal x.

As illustrated in the state numbers 2-2 to 2-4, there can be variations in which each IC chip unit does not respond with a signal. In this way, the RFID unit 301 is characterized in that the UUID is recorded as a unique ID at the time of manufacture and that the output signal information changes from the signal x to the signal y or z before and after the separation as added to the UUID.

Table 1 illustrates variations of signals before and after the separation. The present exemplary embodiment is implemented by selecting an optimal combination of signals before and after the separation based on use cases. For example, in a case of an RFID unit to be attached to a paper carton package 131 as illustrated in FIG. 5 (described below), it is not necessary to distinguish between a separation piece A (RFID unit A 301A) and a separation piece B (RFID unit B 301B), and therefore the present exemplary embodiment can be implemented with any combination. In a case of an RFID unit to be attached to a toner cartridge package 135 as illustrated in FIG. 5, the present exemplary embodiment can be implemented with a combination of "1-1 (or 1-2)" in the separation state "Before separation" and "2-1" in the separation state "After separation" if the cartridge main body and the cap are to be respectively tracked. Alternatively, when the cartridge main body is to be tracked and the cap is not, the present exemplary embodiment can be implemented with a combination of "1-1 (or 1-2)" in the separation state "Before separation" and "2-2" in the separation state "After separation".

Variations of signals before and after the separation are not limited to Table 1, and other variations are also applicable.

Figure 4A:
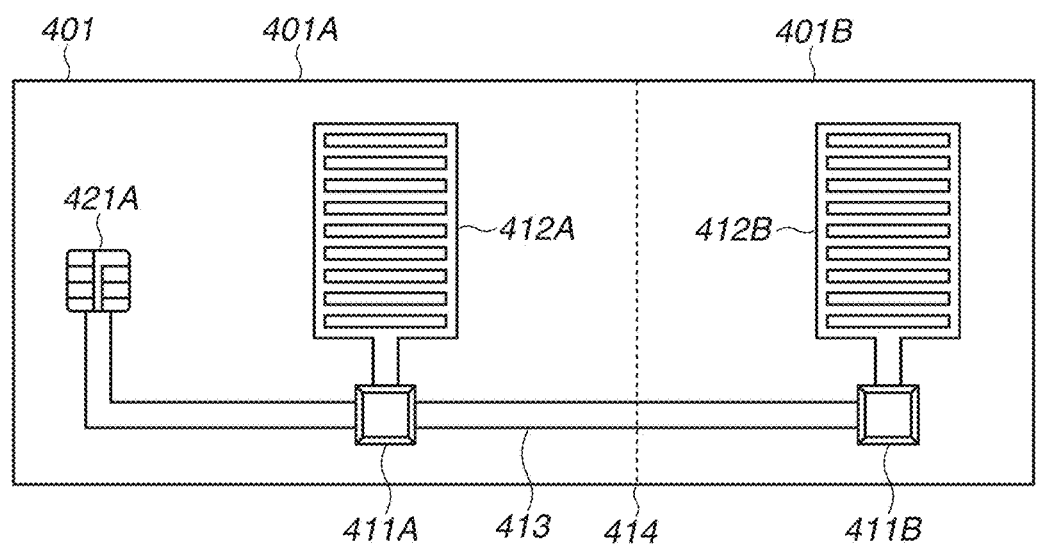
FIGS. 4A and 4B illustrate a second RFID unit according to the present exemplary embodiment.
Figure 4B:
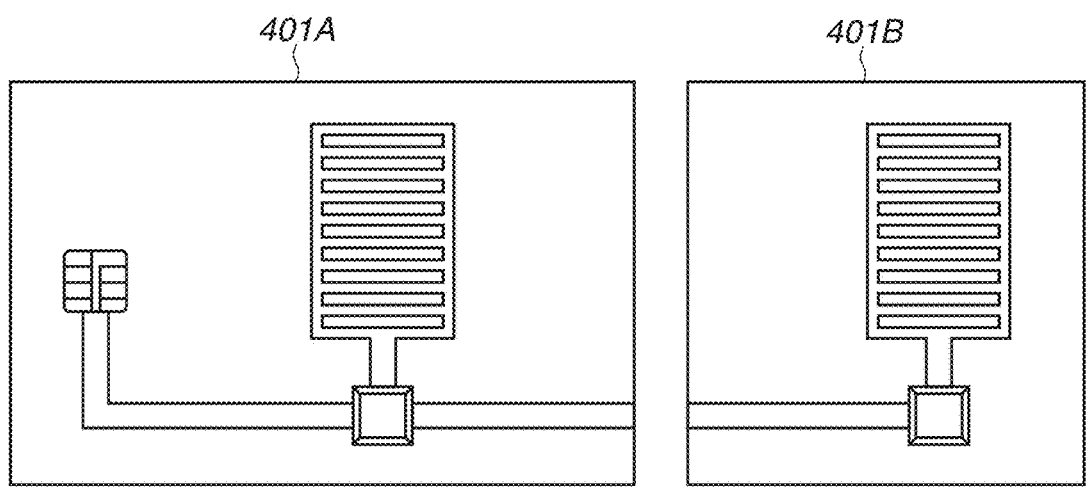

FIGS. 4A and 4B illustrate an example of a second RFID unit according to the present exemplary embodiment.

An RFID unit A 401A, an IC chip portion A 411A, an antenna portion A 412A, an RFID unit B 401B, an IC chip portion B 411B, an antenna portion B 412B, a conductive portion 413, and a break line 414 of the RFID unit 401 are configured in a similar way to the RFID unit A 301A, the IC chip portion A 311A, the antenna portion A 312A, the RFID unit B 301B, the IC chip portion B 311B, the antenna portion B 312B, the conductive portion 313, and the break line 314, respectively, illustrated in FIGS. 3A and 3B. Therefore, redundant descriptions thereof will be omitted.

The RFID unit 401 is different from the RFID unit 301 illustrated in FIGS. 3A and 3B in that the RFID unit 401 includes a contact-type IC reading unit 421A for reading information about the IC chip portion A 411A from an external apparatus through contact-type communication. When the contact-type IC reading unit 421A receives contact-type communication from the IC chip reader 631 (FIG. 6) included in the device 121, for example, the contact-type IC reading unit 421A can acquire information from the IC chip portion A 411A and output the information to the IC chip reader 631.

Similar to the RFID unit 301, the RFID unit 401 can also be separated into two medium pieces, the RFID unit A 401A and the RFID unit B 401B, on a break line 414 as a boundary, as illustrated in FIG. 4B. Similar to the RFID unit 301, the RFID unit 401 is also configured to change signals acquirable from the RFID before and after the separation, based on the electronic circuit design for the IC chip portion A 411A and the IC chip portion B 411B. Table 2 illustrates variations in change of signals acquirable from the RFID before and after the separation of the RFID unit 401.

TABLE 2

| Separation state | State number | IC chip portion A (wireless) | IC chip portion A (contact type) | IC chip portion B (wireless) |
|---|---|---|---|---|
| Before separation | 1-1 | UUID + signal x | None | None |
|  | 1-2 | None | None | UUID + signal x |
|  | 1-3 | UUID + signal x | UUID + signal x | None |
|  | 1-4 | None | UUID + signal x | UUID + signal x |
| After separation | 2-1 | UUID + signal y | UUID + signal y | UUID + signal z |
|  | 2-2 | UUID + signal y | UUID + signal y | None |
|  | 2-3 | None | UUID + signal y | UUID + signal z |
|  | 2-4 | None | UUID + signal y | None |

As illustrated in Table 2, variations of responding signals from the IC chip portion A 411A and the IC chip portion B 411B through RFID wireless communication via the antenna portion A 412A and the antenna portion B 412B, respectively, are identical to variations illustrated in Table 1. Referring to Table 2, before the separation, the RFID unit 401 can read, as a variation, in addition to the UUID of the IC chip portion A 411A, the signal x from the contact-type IC reading unit 421 (state number 1-3 or 1-4). After the separation, in addition to the UUID of the IC chip portion A 411A, the signal y can be read from the contact-type IC reading unit 421 (state numbers 2-1 to 2-4).

Variations of signals before and after the separation are not limited to Table 2, and other variations are also applicable.

While, in the examples illustrated in FIGS. 3A, 3B, 4A, and 4B, the RFID unit is separable into two medium pieces, the RFID unit can also be separable into three or more medium pieces. In this case, for example, before the separation, signals including the UUID can be acquired from either one of RFID units. After the separation, any one or each of separation medium pieces transmits a signal (including the UUID) different from the signal before the separation. In other words, signals acquired from the RFID change before and after the separation.

An RFID unit separable into three or more medium pieces can, for example, have N−1 break lines and be separated into N medium pieces on these break lines (N is 3 or a larger integer) as boundaries. In this case, the circuit can be designed such that signals acquired from the IC chip portions adjacent to the break line change before and after the separation, making it possible to determine the break line on which the medium has been separated.

An RFID unit will be specifically described below. As an example, in the RFID unit, a first IC chip portion, a second IC chip portion, . . . , an (N−1)th IC chip portion, and an Nth IC chip portion are connected via a first break line, a second break line, . . . , an (N−2)th break line, and an (N−1)th break line, respectively. For example, when the RFID unit is separated by the first break line, signals acquirable from at least either the first or the second IC chip portions change before and after the separation. For example, signals acquirable from the first IC chip portion change from (UUID+signal x1) before the separation, to (UUID+signal y1) after the separation. When the RFID unit is separated by the second break line, signals acquirable from at least either the second or the third IC chip portions change before and after the separation. For example, signals acquirable from the second IC chip portion change from (UUID+signal x2) before the separation, to (UUID+signal y2) after the separation. When the RFID unit is separated by the (N−2) th break line, signals acquirable from at least one of the (N−2) th or the (N−1) th IC chip portions change before and after the separation. For example, signals acquirable from the (N−2)th IC chip portion change from (UUID+signal xN−2) before the separation, to (UUID+signal yN−2) after the separation. When the RFID unit is separated by the (N−1) th break line, signals acquirable from at least one of the (N−1) th or the Nth IC chip portions change before and after the separation. For example, signals acquirable from the (N−1) th IC chip portion change from (UUID+signal xN−1) before the separation, to (UUID+signal yN−1) after the separation.

An example of applying the RFID units 301 and 401 to packages will be described below with reference to FIG. 5.

In the package 131, the RFID unit 301 is attached such that the unsealing portion of the packing box for storing paper coincides with the break line 314 of the RFID unit 301 (or configured as a part of the package 131), and the RFID unit 301 is separated when the packing box is unsealed. The RFID units 301 and 401 are sheet-like media (which are so-called seals) with an adhesion surface, and can be attached to the unsealing portion of a package.

A package 132 is an example of a smaller paper pack with commercial packaging paper stored in the packing box 131. In the package 132, similar to the packing box 131, the RFID unit 301 is attached so that the unsealing portion of the commercial packaging paper coincides with the break line 314 of the RFID unit 301 (or configured as a part of the package 132), and the RFID unit 301 is separated when the commercial packing paper is unsealed.

The package 135 is an example of applying the RFID unit 401 to a toner cartridge package. The toner cartridge is stored in a state where a cap 135B is attached to a toner cartridge main body 135A. When in use, the toner cartridge main body 135A and the cap 135B are separated. In the package 135, the RFID unit 401 is attached such that the threading line of the cap 135B coincides with the break line 414 of the RFID unit 401 (disposed over the toner cartridge main body 135A and the cap 135B), and the RFID unit 401 is separated when the cap 135B is unsealed. The attachment of the RFID unit 401 is made such that the RFID unit A 401A remains on the toner cartridge main body 135A and the RFID unit B 401B remains on the cap 135B after the cap 135B is unsealed. While, in the above description, a toner cartridge is used as an example of the package 135, the package 135 can be any article as long as the article is stored in a state where a predetermined member (such as a protection cap) is attached to the article main body, and the predetermined member needs to be detached from the article main body when in use.

In the above-described examples, the RFID unit that is separately manufactured is attached to a package afterwards. However, depending on the progress of the production technology in the above-described printable electronics, an electronic circuit can also be directly printed on the packages 131, 132, and 135. Therefore, the RFID unit can be attached using either a method for attaching the RFID unit to a package afterwards or a method for directly printing an electronic circuit on the package itself.

Figure 6:
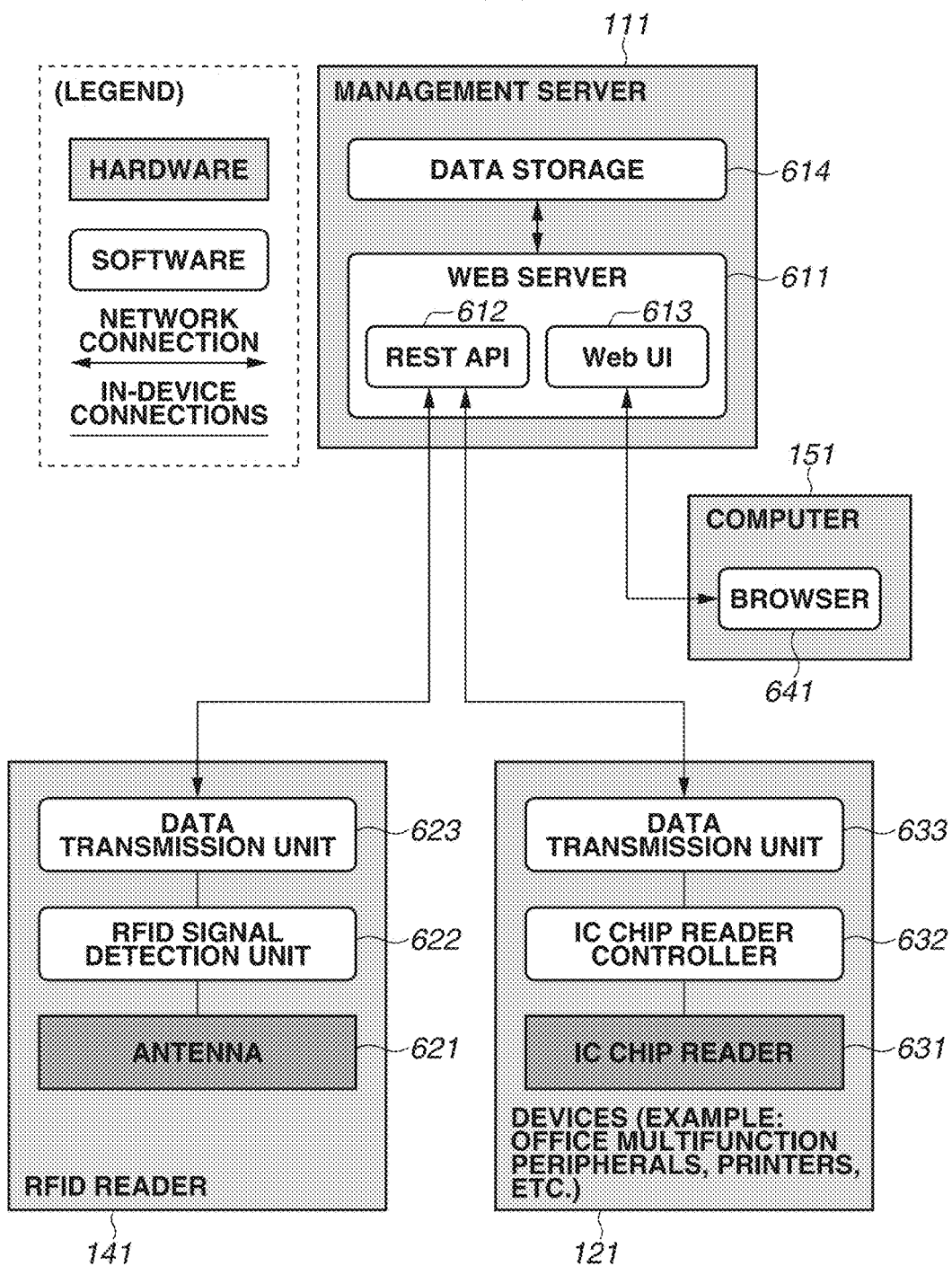
FIG. 6 illustrates a software configuration of the system according to the present exemplary embodiment.

FIG. 6 illustrates an example of a software configuration of a system according to the present exemplary embodiment. Software installed in each apparatus functions when the CPU 203 of the apparatus reads a program from the ROM 204, the RAM 205, or the secondary storage device 206 and then executes the program. Software components installed in each apparatus are configured to communicate with each other, as illustrated by the arrows indicating network connections.

The management server 111 includes a web server 611 installed therein. The web server 611 provides a Representational State Transfer (REST) Application Programming Interface (API) 612 and a web UI 613. The management server 111 also includes a data storage 614 for storing collected data.

The RFID reader 141 includes the antenna 621 as a hardware component for reading a peripheral RFID through wireless communication. An RFID signal detection unit 622 is software for detecting a change in the presence/absence of signals and change of signals of the RFID units 301 and 401. A data transmission unit 623 is software for transmitting a notification of change of signals detected by the RFID signal detection unit 622 to the management server 111.

The device 121 includes the IC chip reader 631. The IC chip reader 631 is a contact-type hardware component for reading information about the RFID unit A 401A attached to the toner cartridge 135A. An IC chip reader controller 632 is software for controlling the IC chip reader 631. A data transmission unit 633 is software for transmitting a notification of change of signals detected by the IC chip reader controller 632 to the management server 111.

A browser 641 is a web browser installed in the computer 151. The browser 641 accesses the web UI 613 of the management server 111 to display a HyperText Markup Language (HTML) document.

Figure 7:
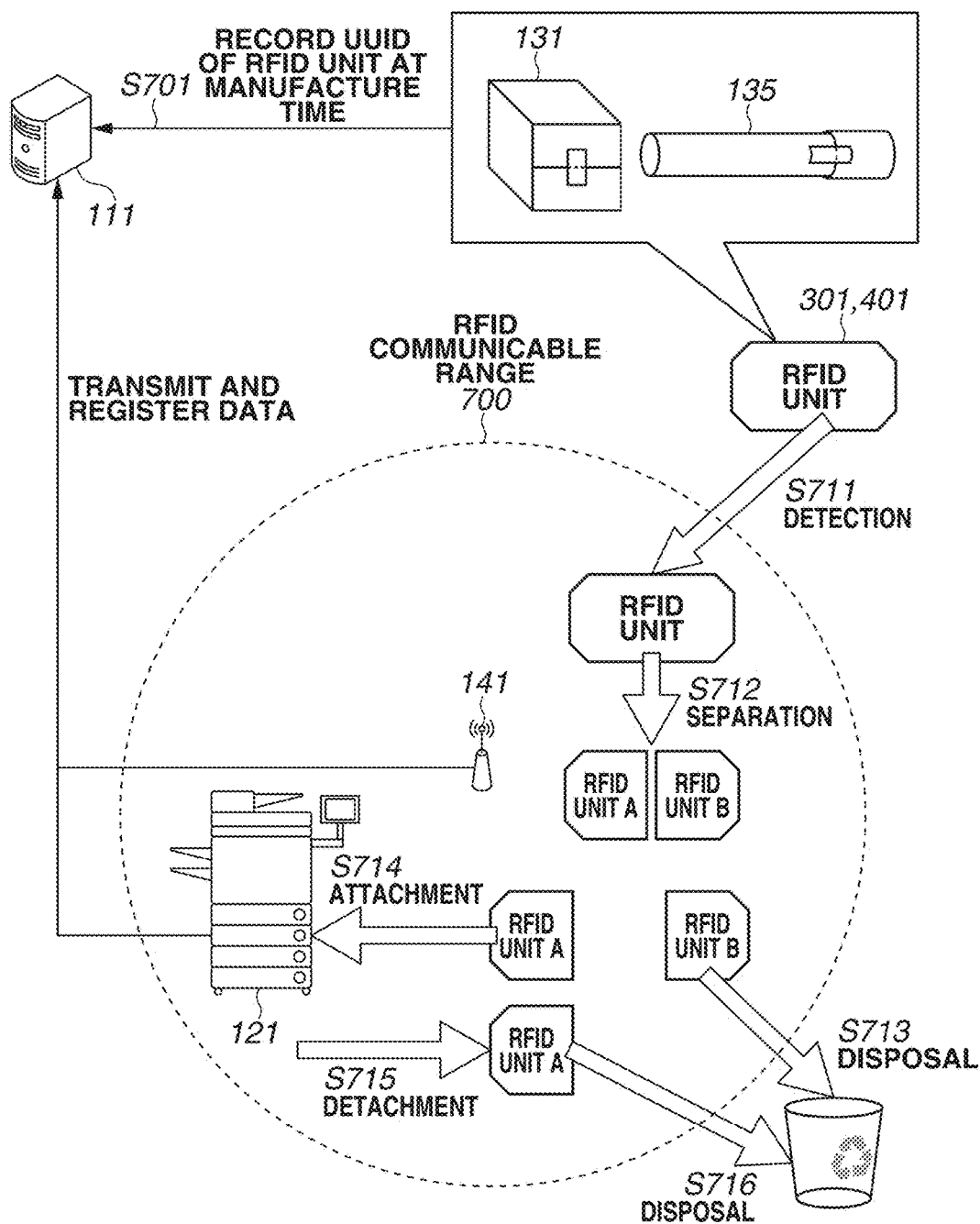
FIG. 7 illustrates a life cycle of the RFID units according to the present exemplary embodiment.

FIG. 7 illustrates an example of a life cycle of the RFID units 301 and 401 attached to the packages 131, 132, and 135.

In step S701, when the RFID units 301 and 401 are attached to the packages 131, 132, and 135 at the time of manufacture, the UUID of the RFID unit is recorded in the production record of the package products. In step S711, when the package products distributed in the market enter a communicable range 700 of the RFID reader 141, the RFID units 301 and 401 are detected by the RFID reader 141. At this time, the RFID units 301 and 401 are outputting the signal x before the separation. Therefore, the management server 111 that received a notification from the RFID reader 141 can recognize that the packages associated with the RFID units 301 and 401 are new articles before unsealing. Upon detection a change in the presence/absence and change of the contents of the signals of the RFID units 301 and 401, the RFID reader 141 transmits data acquired from the RFID to the management server 111 for registration.

In step S712, when the packages are unsealed and the products are taken out, the RFID units 301 and 401 are separated. After the separation, since the RFID units 301 and 401 output the signal y or z, the management server 111 that received a notification of change of signals from the RFID reader 141 can recognize that the packages associated with the RFID units 301 and 401 have been unsealed.

In step S713, the package, the cap, and other portions that are not actually used are discarded. When the package packing, the cap, etc. is placed out of the communicable range 700 of the RFID reader 141, the RFID reader 141 cannot receive signals from the RFID units B 301B and 401B. Therefore, the management server 111 that received a notification of change of signals from the RFID reader 141 can recognize that the packages associated with the RFID units B 301B and 401B have been discarded.

In a case of an article attachable to the device 121, such as the toner cartridge main body 135A, the IC chip reader 631 in the device 121 can read information about the IC chip portion A 411A via the contact-type IC reading unit 421A of the RFID unit A 401A. Therefore, in step S714, the management server 111 that received a notification of change of signals from the device 121 can recognize that the packages with the RFID units B 301B and 401B attached thereto have been attached to the device 121. Upon detection of a change in the presence/absence and change of the contents of the signals of the RFID units 301 and 401, the device 121 transmits data acquired from the RFID to the management server 111 for registration.

While the combination of the IC chip reader 631 and the contact-type IC reading unit 421A is desirable to detect the attachment to the device 121 because of the high reliability of signal reading, wireless communication is also possible. For example, if the device 121 is provided within the RFID reader 141, it is possible to distinguish a package placed out of the device 121 as stock and a package attached in the device 121 based on changes of the signal strength in wireless communication. If the RFID reader 141 is configured to detect only the RFID at a very short distance of, for example, 10 centimeters or less from the attachment position of the toner cartridge 135A within the device 121, the attachment can be detected only through RFID wireless communication.

When the used toner cartridge 135A is detached from the device 121, the IC chip reader 631 within the device 121 becomes unable to read information about the IC chip portion A 411A. Therefore, in step S715, the management server 111 that received a notification of change of signals from the device 121 can recognize that the package with the RFID unit A 401A attached thereto has been detached.

When the packages are disposed of or recycled, the RFID units 301 and 401 are placed out of the communicable range 700 of the RFID reader 141. When the packages are discarded and placed out of the communicable range 700, the RFID reader 141 becomes unable to receive signals from the RFID units A 301A and 401A. In step S716, therefore, the management server 111 that received a notification of change of signals from the RFID reader 141 can recognize that the packages associated with the RFID units have been discarded.

In this way, if the RFID units 301 and 401 are attached (incorporated) to (into) the packages, unsealing of the packages can be detected and the stock can be suitably managed.

FIG. 8 is a state transition diagram that defines state transitions of the packages with the RFID units 301 and 401 attached thereto.

In the RFID units 301 and 401, as described above, since the UUID is issued for each individual product, status tracking is performed for each UUID. In the initial state, if no signal has been received from the RFID units, the state transition starts from the lost state. In step S801, when the RFID reader 141 detects the signal x, the state transitions to "1. New Article". In step S802, when the RFID reader 141 detects the signal y or z, the state transitions to "2. Unsealed". If the signal x of the RFID unit 401 is detected, sub state tracking is possible in the state "2. Unsealed" since the RFID unit 401 is provided with the contact-type IC reading unit 421A.

The initial state of the sub state is the state "3. Detached". In step S803, when the RFID reader 141 detects the signal y via the contact-type IC reading unit 421A, the state transitions to "4. Attached". In step S804, when the RFID reader 141 detects a change from the signal y to the signal absence via the contact-type IC reading unit 421A, the state returns to "3. Detached". When the RFID reader 141 detects the disappearance of the signal y or z from the state "3. Detached", the state transitions to "5. Discarded or Lost". "Lost" corresponds to a state where the consumable has been brought out.

In step S806, when the RFID reader 141 detects the disappearance of the signal x and does not detect the signal y or z from the state "1. New Article", the state transitions to "5. Discarded or Lost". In this case, it can be estimated that the package before unsealing (new article) has been brought out.

If a state machine based on the state transition diagram as illustrated in FIG. 8 is built into the management server 111, the states of packages with the RFID unit built therein can be tracked for each individual package based on the UUID based on change of signals from the RFID unit.

Package statuses and status history display screens will be described below with reference to FIGS. 9 to 12. The screens illustrated in FIGS. 9 to 12 are provided by web UI 613 and displayed on the browser 641 when the user accesses the web server 611 of the management server 111 from the browser 641 of the computer 151.

FIG. 9 illustrates an example screen displaying the statuses of the paper packages 131 and 132. A screen 900 is web UI for displaying a list of paper packages and is provided by the web UI 613.

A UUID 901 indicates the UUID assigned to each RFID unit. As illustrated in FIG. 9, in addition to the UUID 901, the screen 900 can display a maker, product name, product code, package type, serial number, and date of manufacture as product information. At the time of manufacture in step S701 illustrated in FIG. 7, these pieces of additional data can be registered in the management server 111 in association with the UUID or recorded in at least one of the IC chip portions in the RFID unit together with the UUID.

A status 902 indicates the current state of the package identified by the state machine described with reference to FIG. 8. A status update date and time 903 indicates the date and time when information was updated to the current status. FIG. 9 illustrates an example display in a state where information is sorted in terms of the status update date and time 903.

In the example illustrated in FIG. 9, the second to the sixth rows correspond to information about a product "Printer Paper N1" with serial number "F01-L59-1609". The fourth row corresponds to the package (packing box) of a paper carton. The second, third, fifth, and sixth rows correspond to four smaller paper packs (commercial packaging paper) stored inside the paper carton (packing box) corresponding to the fourth row. The packing box is in the state "Unsealed", and the four different commercial packaging paper are in the states "Unsealed", "Discarded", "Lost", and "New Article", respectively.

FIG. 10 illustrates an example screen displaying the status history of the paper packages 131 and 132.

A screen 1000 is a web UI displaying the status history of a paper package and is provided by web UI 613. The screen 1000 is displayed, for example, when any one package is selected from the paper package list illustrated in FIG. 9. The screen 1000 displays the status history of the selected package. The example illustrated in FIG. 10 corresponds to a case where the package in the third row of the screen illustrated in FIG. 9 is selected.

Similar to the screen illustrated in FIG. 9, the screen 1000 also displays the UUID and additional data information 1001. The screen 1000 also displays the history of state transition and information 1002 about the date and time when the status was updated to shift to each state. The example display illustrated in FIG. 10 indicates that the package was detected as a "New Article" at 1:43:03 p.m. on Jan. 8, 2017, changed to "Unsealed" at 10:01:22 a.m. on Jan. 11, 2017, and "Discarded" at 10:17:55 a.m. on Jan. 11, 2017.

FIG. 11 illustrates an example screen displaying the statuses of the toner cartridge package 135.

A screen 1100 is web UI displaying a list of toner cartridge packages and is provided by web UI 613.

A UUID 1101 and a status update date and time 1103 are similar to the UUID 901 and the status update date and time 903, respectively, described with reference to FIG. 9, and redundant descriptions thereof will be omitted. A status 1102 indicates the current state of the package identified by the state machine, similar to the status 902 illustrated in FIG. 9. The status 1102 differs from the status 902 in that tracking is possible up to the sub states "3. Detached" and "4. Attached" described with reference to the state transition diagram illustrated in FIG. 8.

FIG. 12 illustrates an example screen displaying the status history of the toner cartridge package 135.

A screen 1200 is web UI displaying the status history of a toner cartridge package and is provided by web UI 613. The screen 1200 is displayed, for example, when any one package is selected from the paper package list illustrated in FIG. 11. The screen 1200 displays the status history of the selected package. The example illustrated in FIG. 12 corresponds to a case where the package in the second row of the screen illustrated in FIG. 11 is selected.

Similar to the screen illustrated in FIG. 11, the screen 1200 also displays the UUID and additional data information 1201. The screen 1200 also displays the history of state transition and information 1202 about the date and time when the status was updated to shift to each state. The information 1202 differs from the information 1002 in that tracking is possible up to the sub states "3. Detached" and "4. Attached" described with reference to the state transition diagram illustrated in FIG. 8.

Referring to the paper package status display illustrated in FIG. 9, a plurality of the packages 132 can exist in the package 131. In this case, the management server 111 grasps the inventory figures of the packages 132 for each package 131 using the inclusive relation between the packages 131 and 132.

In the system according to the present exemplary embodiment, the inclusive relation between the UUID of the RFID unit attached to the package 131 and the UUIDs of the RFID units attached to the packages 132 is separately stored as data. By using this data, the management server 111 can grasp the inventory figures of the packages 132 for each package 131.

According to the present exemplary embodiment, the unit of the package 131 is a carton and four different commercial packaging paper packages 132 can be stored for each carton. FIG. 13 illustrates an example in which the inclusive relation is represented by JSON format.

The inclusive relation between packages can be tracked by storing the JSON data in the management server 111 or recording the JSON data in at least one of the IC chip portions of the RFID unit. For example, assume a case where 200 paper sheets are stored in one commercial packaging paper package 132, and four commercial packaging paper packages are stored in one carton. In other words, a total of 800 paper sheets are stored per carton. In this case, the paper stock in the carton identified by a specific UUID can be calculated as the total number of sheets of unsealed commercial packaging paper packages with four UUIDs in the inclusive relation.

By using the above-described RFID unit, the stock of articles can be grasped through RFID wireless communication, as well as the unsealed condition and use condition can be tracked for each individual package. This enables distinguishing between the RFID attached to new consumables and the RFID attached to used consumables to be discarded, and the inventory figures of usable consumables can be correctly grasped. By utilizing an additional contact-type IC reading unit, for example, the attachment state can be reliably grasped when attaching a consumable to a device.

The application of the RFID unit according to the present exemplary embodiment is not limited to packages of consumables of an image forming apparatus. The RFID unit can also be applied, for example, to the management of any articles including food packages on a built-in basis.

As described above, the medium (the RFID units 301 and 401) according to the present exemplary embodiment is built in a portion to be removed or separated when starting the use of a consumable. For example, when unsealing a package of the consumable, such as a toner cartridge and paper. Thus, statuses (unsealed, before and after starting the use) can be acquired from each member through wireless communication, making it possible to grasp and track the unsealed condition and use condition for each individual package through RFID wireless communication.

Conventionally, issues have occurred when acquiring inventory information of consumables, such as toner cartridges and paper, from each individual package and article main body of these consumables through RFID wireless communication. For example, it has been difficult to track suitable inventory information depending on the way a consumable is used by the user. For example, an unsealed package to be discarded (collected) is neglected. However, according to the present exemplary embodiment, even if a consumable is used in this way, a sealed package and an unsealed package can be managed in a distinguishing way, making it possible to suitably manage consumables. Thus, according to the present exemplary embodiment, wireless communication enables suitably grasping and tracking the unsealed condition and use condition for each individual article.

While, in the above-described exemplary embodiment, an RFID-based medium is employed, the medium according to the present disclosure is not limited to RFID. The present disclosure is also applicable to other wirelessly readable IC tags (electronic tags). While the present disclosure has been described based on the above-described data configurations and compositions, these are not seen to be limiting, and are applicable to various configurations and compositions based on their applications and purposes.

While the present disclosure has been described based on one exemplary embodiment, the disclosure can be embodied in a system or apparatus in a built-in manner, for example, or embodied as a method. All configurations realized by suitably combining the above-described exemplary embodiments are also intended to be included in the present disclosure.

The above-described exemplary embodiments are not seen to be limiting, and can be modified in diverse ways without departing from the spirit and scope thereof. These modifications are not excluded from the scope of the present disclosure. More specifically, all of configurations realized by suitably combining the above-described exemplary embodiments and modifications thereof are also intended to be included in the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-067277, filed Mar. 30, 2017, which is hereby incorporated by reference herein in its entirety.

What is claimed is:

1. A separable system, comprising:
a first unit configured to include an antenna that transmits a signal and a memory that stores identification information; and
a second unit configured to include an antenna that transmits a signal and a memory that stores identification information,
wherein, upon receipt of an externally generated electromagnetic wave in a state where the first unit and the second unit are connected, a first signal including the identification information stored in the memory of either the first unit or the second unit is transmitted from the antenna of the respective first unit or the second unit via wireless communication, and
wherein, in a case where a first system including the first unit and a second system including the second unit are separated by an external factor acting on the separable system, upon receipt of an externally generated electromagnetic wave in at least either the first system or the second system after the separation, a second signal different from the first signal, including the identification information stored in the memory of the first unit or the second unit included in the first system or the second system respectively, is transmitted from the antenna of the respective first unit or the second unit respectively included in the first system or the second system via wireless communication,
wherein either the first unit or the second unit includes a device for outputting a signal including the identification information stored in the memory of the first unit or the second unit via contact-type communication with an external apparatus without the receipt of the externally generated electromagnetic wave,
wherein, in a case where the contact-type communication with the external apparatus occurs after separation of the separable system, the device outputs to the external apparatus the second signal including the identification information stored in the memory of the first unit or the second unit including the device, and
wherein, in a case where the contact-type communication with the external apparatus occurs before separation of the separable system, the device does not output a signal to the external apparatus.

2. The separable system according to claim 1, wherein the identification information stored in the memory of the first unit and the identification information stored in the memory of the second unit are identical identification information.

3. The separable system according to claim 1,
wherein the identification information stored in the memory of the first unit is a fist unique ID and the identification information stored in the memory of the second unit is a second unique ID, and
wherein, information for associating the first unique ID with the second unique ID is stored in the memory of at least one of the first or the second unit or is managed by an external system.

4. The separable system according to claim 1,
wherein the first signal includes the identification information stored in the memory of either the first unit or the second unit and first signal information, and
wherein the second signal includes the identification information stored in the memory of either the first unit or the second unit and second signal information different from the first signal information.

5. The separable system according to claim 1,
wherein the separable system is configured as a part of an article that is kept in storage in a state where a predetermined member is attached to an article main body and requires that the predetermined member be detached from the article main body when the article is used, and
wherein the separable system is disposed over the article main body and the predetermined member so as to be separated into the first system and the second systems when the predetermined member is detached from the article main body.

6. The separable system according to claim 1, wherein the separable system has a sheet-like shape.

7. The separable system according to claim 6, wherein the sheet-like shaped separable system includes an adhesion surface.

8. The separable system according to claim 1, wherein the separable system is configured as a part of an unsealing portion of a package so as to be separated into the first system and the second systems when the package is unsealed.

9. The separable system according to claim 8, wherein the separable system is formed of an electronic circuit printed on the unsealing portion of the package.

10. The separable system according to claim 1, wherein the separable system includes a break line for separation into the first system and the second systems in response to the external factor.

11. The separable system according to claim 1, wherein the first unit and the second unit are Radio Frequency Identifier (RFID) units.

12. The separable system according to claim 1, wherein at least either the first signal or the second signal is read by an external apparatus and transmitted to a system for managing articles in association with the identification information.

* * * * *